(12) United States Patent
Engel et al.

(10) Patent No.: US 8,947,247 B2
(45) Date of Patent: Feb. 3, 2015

(54) SYSTEM AND METHOD FOR DETECTING AND PREVENTING CABLE THEFT IN ELECTRIC VEHICLE SUPPLY EQUIPMENT (71) Applicants: Joseph Engel, Monroeville, PA (US); Vincent J. Kayser, Lothian, MD (US); Gurdarshan Singh Tiwana, Bangalore (IN); Mahidhar Reddy, Annapolis, MD (US)

(72) Inventors: Joseph Engel, Monroeville, PA (US); Vincent J. Kayser, Lothian, MD (US); Gurdarshan Singh Tiwana, Bangalore (IN); Mahidhar Reddy, Annapolis, MD (US)

(73) Assignee: Semaconnect, Inc., Annapolis, MD (US)

( * ) Notice: Subject to any disclaimer, the term of this patent is extended or adjusted under 35 U.S.C. 154(b) by 143 days.

(21) Appl. No.: 13/685,996

(22) Filed: Nov. 27, 2012

(65) Prior Publication Data
US 2014/0145854 A1 May 29, 2014

(51) Int. Cl.
G08B 21/00 (2006.01)
G08B 13/22 (2006.01)

(52) U.S. Cl.
CPC .................................. G08B 13/22 (2013.01)

USPC ........... 340/650; 340/635; 340/455; 340/540; 320/109

(58) Field of Classification Search
CPC ....................................................... G08B 13/22
USPC ................. 340/635, 650, 455, 540, 657, 664, 340/636.1, 636.2; 320/109, 104; 701/22; 324/509, 503
See application file for complete search history.

(56) References Cited

U.S. PATENT DOCUMENTS

| 8,509,976 B2 * | 8/2013 | Kempton | 701/22 |
| 2010/0271192 A1 * | 10/2010 | Mituta | 340/455 |
| 2012/0206100 A1 * | 8/2012 | Brown et al. | 320/109 |
| 2013/0190968 A1 * | 7/2013 | Nitzberg et al. | 701/31.6 |
| 2013/0320920 A1 * | 12/2013 | Jefferies et al. | 320/109 |

* cited by examiner

Primary Examiner — Anh V La
(74) Attorney, Agent, or Firm — Womble, Carlyle, Sandridge & Rice, LLP (57) ABSTRACT A system and method is provided for preventing cable theft in electric vehicle supply equipment (EVSE). A sensor may be configured to sense a short between at least two components of a cable in the EVSE. A processor may be configured to determine that the cable is being cut in response to the sensing. The processor may be further configured to generate an alert in response to a determination that the cable is being cut.

20 Claims, 9 Drawing Sheets

SYSTEM AND METHOD FOR DETECTING AND PREVENTING CABLE THEFT IN ELECTRIC VEHICLE SUPPLY EQUIPMENT

TECHNICAL FIELD

The present disclosure relates to the field of electric vehicle supply equipment (EVSE)s. More specifically, the present disclosure relates to detecting and preventing cable theft in electric vehicle supply equipment (EVSE).

BACKGROUND

An electric vehicle supply equipment (EVSE) supplies electric energy for charging/recharging of electric vehicles plugged into the equipment. The equipment is usually unattended and installed in unlighted and secluded locations. Cables used in the electric vehicle charging station are openly and prominently displayed in front of the equipment. The cables are formed primarily of copper. Copper is an expensive metal and cables are usually stolen so that the copper can be sold as scrap. It usually takes less than a few seconds to cut and remove the cable from the equipment. Thus, a detection system needs to detect whether a cable is being cut relatively quickly.

As such, what is needed is an efficient way to detect and possibly prevent cable theft.

These and other drawbacks exist.

BRIEF SUMMARY

An electronic system, including hardware, firmware, and methods for detecting and possibly preventing cable theft in an EVSE are described herein.

According to one aspect of the present disclosure, the method may include a plurality of operations. In some implementations, the operations may include sensing a short between at least two components of a cable in the EVSE. In some implementations, the operations may include determining that the cable in the EVSE is being cut in response to the sensing. In some implementations, the operations may include generating local and/or remote alerts in response to a determination that the cable is being cut.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
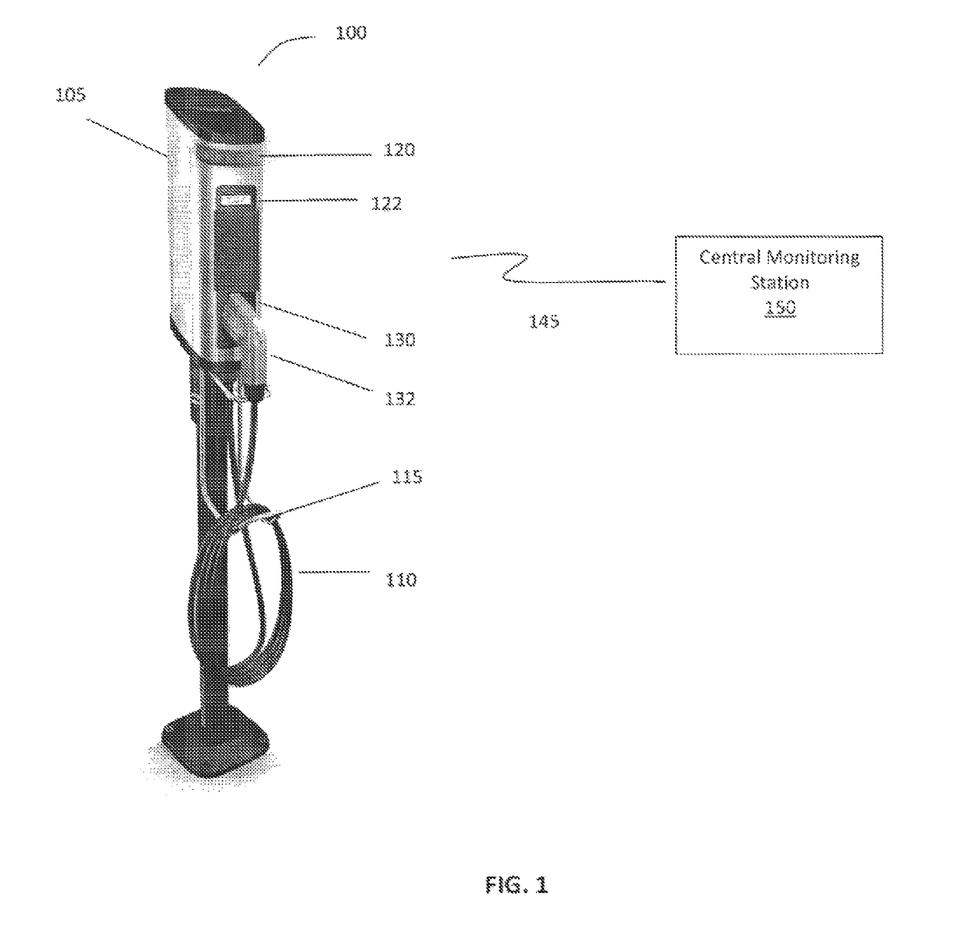
FIG. 1 illustrates an exemplary electric vehicle supply equipment (EVSE), according to various aspects of the invention.

FIG. 1 illustrates an exemplary electric vehicle supply equipment (EVSE) 100, according to various aspects of the invention. EVSE 100 may include an enclosure 105 that houses one or more components of the EVSE 100. Externally, enclosure 105 may include, among other things, LED (light emitting diode) lights 120, a display screen 122 (for example, liquid crystal display or other display), and an opening 130 that accepts a J1772 connector 132 for storage. When connector 132 is plugged into a mating plug on an electric vehicle or plug-in hybrid electric vehicle it is capable of charging the vehicle.

EVSE 100 may include a cable 110 of a particular length that ensures easy charging access over or around the electric vehicle. In some implementations, the cable length may be 18 feet, though other cable lengths may be used without departing from the scope of the invention. In some implementations, the cable may be used to supply electric energy for charging/recharging of electric vehicles plugged into the EVSE 100.

In some implementations, cable 110 and connector 132 may be specified per the SAE J1772 standard. In some implementations, cable 110 may include at least four conductors. In some implementations, cable 110 may include at least two power conductors, at least one ground conductor, and at least one pilot (communications) conductor. In some implementations, cable 110 may include an additional fifth conductor which may be used to power an optional LED mounted in the head of connector 132 as an aid for night use. In some implementations, the additional fifth conductor may be used for other purposes without departing from the scope of the invention.

Figure 2A:
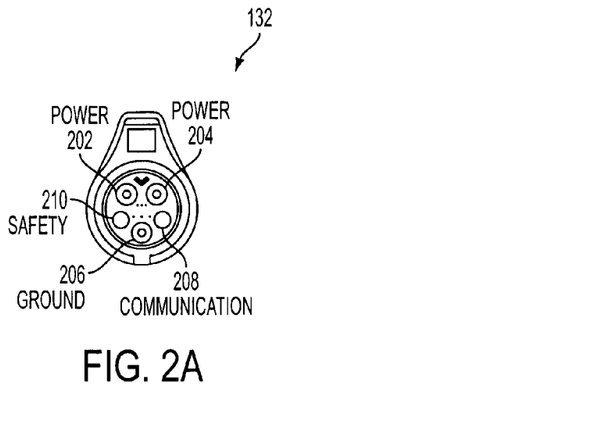
FIG. 2A illustrates a terminal end of an exemplary SAE J1772 connector, according to various aspects of the invention.
Figure 2B:
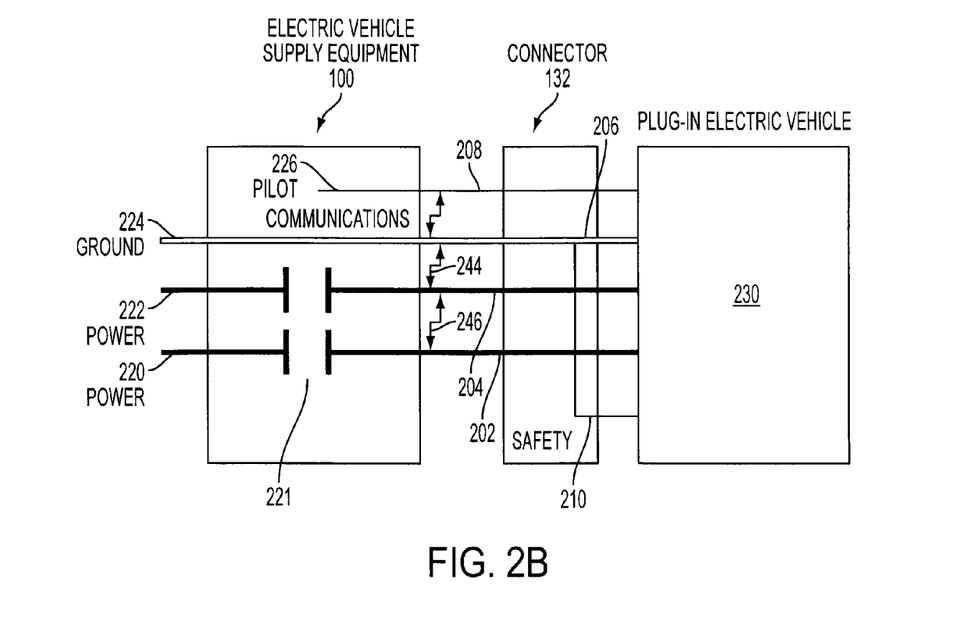
FIG. 2B illustrates an exemplary EVSE connected to a plug-in electric vehicle through a SAE J1772 cable, according to various aspects of the invention.

FIG. 2A depicts a terminal end of connector 132 having five female terminals 202, 204, 206, 208, and 210 that plug into a mating plug on the electric vehicle. In some implementations, terminal 202 may be associated with a first power conductor of cable 110, terminal 204 may be associated with second power conductor of cable 110, terminal 206 may be associated with a ground conductor of cable 110, and terminal 208 may be associated with a pilot (communication) conductor of cable 110. In some implementations, a fifth terminal 210 labeled "Safety" may be used by the electric vehicle to detect that the cable/connector is plugged into the vehicle. In some implementations, the fifth terminal may be referred to as "Safety" or "Proximity". In some implementations, the safety terminal 210 may be connected to the ground terminal 206 within the connector housing as shown in FIG. 2B. If the connector 132 is plugged into the electric vehicle, the electric vehicle's safety terminal is grounded, else not. This allows the electric vehicle to determine whether it is connected to an EVSE 100. This information may be used by the electric vehicle to enable/disable certain features. For example, if the connector 132 is plugged into the electric vehicle, a safety feature may be enabled which ensures that the electric vehicle cannot be moved.

In some implementations, the conductors may be formed primarily of copper or copper alloy. In some implementations, the conductors may be formed primarily of a conductive material other than copper as would be appreciated. In some implementations, the conductors may be insulated by an insulating layer. The insulating layer may include UL 62 approved material such as, for example, UL Type EV and EVJ, chlorinated polyethylene (CPE); UL Type EVE and EVEJ, thermoplastic elastomer (TPE); and UL Type EVT and EVTJ, polyvinyl chloride (PVC).

As will be appreciated, other cable constructions including, shielding layers, etc. may be used without departing from the scope of the invention.

In some implementations, the mating plug on the electric vehicle may be specified per the SAE J1772 standard to insure that any EVSE is compatible with any electric vehicle (i.e., any EVSE can be used to charge any electric vehicle).

Referring back to FIG. 1, EVSE 100 may include a bracket 115 for coiling/storing cable 110 after a charging session (i.e., after charging of a vehicle). In some implementations, the bracket 115 may be formed of stainless steel, though other materials may be used without departing from the scope of the invention.

In some implementations, EVSE 100 may be communicatively coupled to central monitoring station 150 via link or network 145. In some implementations, link or network 145 may include a Local Area Network, a Wide Area Network, a cellular communications network, a Public Switched Telephone Network, a wireless communication network, and/or other network or combination of networks.

FIG. 2B illustrates an exemplary EVSE connected to a plug-in electric vehicle through a SAE J1772 cable. In some implementations, EVSE 100 may include two power conductors 220, 222 (i.e., first power conductor 220, second power conductor 222) that are utilized to control the application of AC line power to a plug-in electric vehicle 230. EVSE 100 may further include a ground conductor 224 and a pilot (communication) conductor 226. In some implementations, the four conductors 220, 222, 224, and 226 comprise the J1772 cable 110. In some implementations, the cable 110 may include an additional fifth conductor (not otherwise illustrated in FIG. 2B). In some implementations, the 2-pole contactor 221 may control the connection of the utility supply voltage from the EVSE input conductors 220 and 222 to the electric vehicle.

In some implementations, when a thief cuts the cable 110 using a metallic tool (for example, a blade, shears, wire cutters, bolt cutters, etc.), bridging electrical shorts (depicted in FIG. 2B) amongst the four conductors of the cable may be formed. The electrical shorts may include a pilot-to-ground short 242, a power-to-ground short 244, and a power-to-power short 246.

Figure 3:
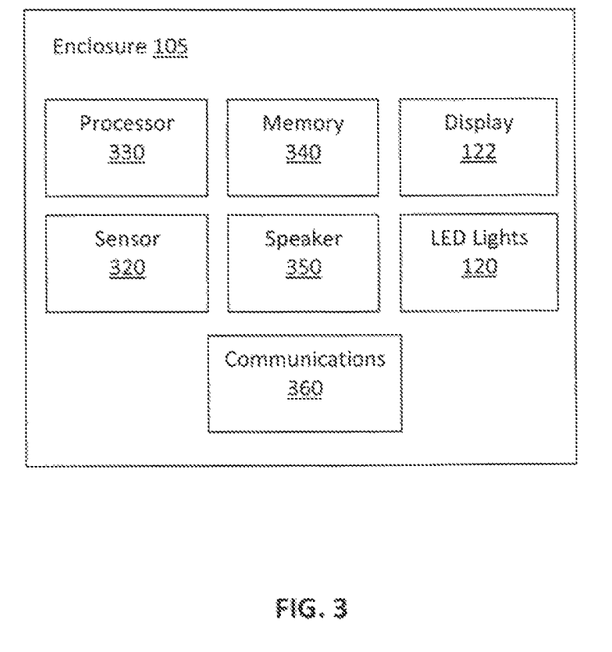
FIG. 3 illustrates components of an enclosure of the EVSE, according to various aspects of the invention.

In some implementations, as depicted in FIG. 3, enclosure 105 of EVSE 100 may include a sensor 320, a processor 330, a memory 340, communications circuitry 360, display screen 122, speaker 350, LED lights 120, and/or other components that facilitate the functions of EVSE 100. In some implementations, processor 330 includes one or more processors or microprocessors configured to perform various functions of EVSE 100. In some implementations, memory 340 includes one or more tangible (i.e., non-transitory) computer readable media. Memory 340 may include one or more instructions that when executed by processor 330 configure processor 330 to perform functions of EVSE 100.

In some implementations, sensor 320 may be configured to sense a short between various pairs of components of cable 110 in the EVSE 100. In some implementations, when cable 110 is cut using a metallic tool, a short may be created between various pairs of conductors of cable 110. For example, a short may be created between two power conductors of cable 110, between a power conductor and a ground conductor of cable 110, or between a ground conductor and a pilot conductor of cable 110, as would be appreciated. In some implementations, sensor 320 may sense the short created.

In some implementations, processor 330 may be configured to determine that cable 110 in the EVSE 100 is being cut in response to the sensing. In some implementations, sensor 320 may communicate a sensing signal to the processor 330 indicating that a short is sensed. In some implementations, processor 330 may receive the sensing signal and determine that cable 110 is being cut in response to the sensing signal.

In some implementations, in response to a determination that cable 110 is being cut, processor 330 may generate at least one alert. In some implementations, the alert may include a local audible alert generated at the EVSE 100. In some implementations, EVSE 100 may include a speaker 350 that is configured to provide the audible alert. The audible alert may be in the form of a siren or alarm, a male/female voice sounding a verbal alarm, and/or other audible alerts. In some implementations, the alert may include a local visual alert generated at the EVSE 100. In some implementations, LED lights 120 and/or display screen 122 may be used to provide visual alerts. For example, LED lights 120 may produce a flashing light pattern (for example, blinking the red LEDs of LED lights 120) to capture attention of nearby people. In some implementations, the alert may include a remote alert communicated by EVSE 100 to central monitoring station 150 via communications circuitry 360. In some implementations, communications circuitry 360 may enable connection and exchange of information with central monitoring station via link or network 145.

In some implementations, central monitoring station 150 may dispatch appropriate personnel (for example, maintenance personnel for replacing cable and returning the EVSE to service in a timely manner; local official for investigating the theft, etc.) to the site of the EVSE 100 where the attempted theft is occurring or has occurred. In some implementations, the local and/or remote alert(s) may be generated to deter a potential thief from attempting cable theft. In some implementations, EVSE 100 and/or central monitoring station 150 may notify or otherwise alert security or police. In some implementations, while such alerts may be too late to prevent loss of a cable (of EVSE 100, for example) which was just cut, the alerts would probably prevent the theft of other cables in the same area as the EVSE. In some implementations, the remote alert may be used by a web-based electric vehicle charger locator system to remove EVSE 100 whose cable has been cut from a list of available charging stations.

In some implementations, cable theft may occur during two conditions: i) EVSE 100 not supplying AC voltage to the plugged in electric vehicle (i.e., when the cable 110/connector 132 is not plugged into the electric vehicle or when the cable 110/connector 132 is plugged into the electric vehicle but contactor 221 is in an opened or non-conducting state); and ii) EVSE 100 supplying AC voltage to the plugged in electric vehicle (i.e., when the cable 110/connector 132 is plugged into the electric vehicle and contactor 221 is a closed or conducting state).

Figure 4:
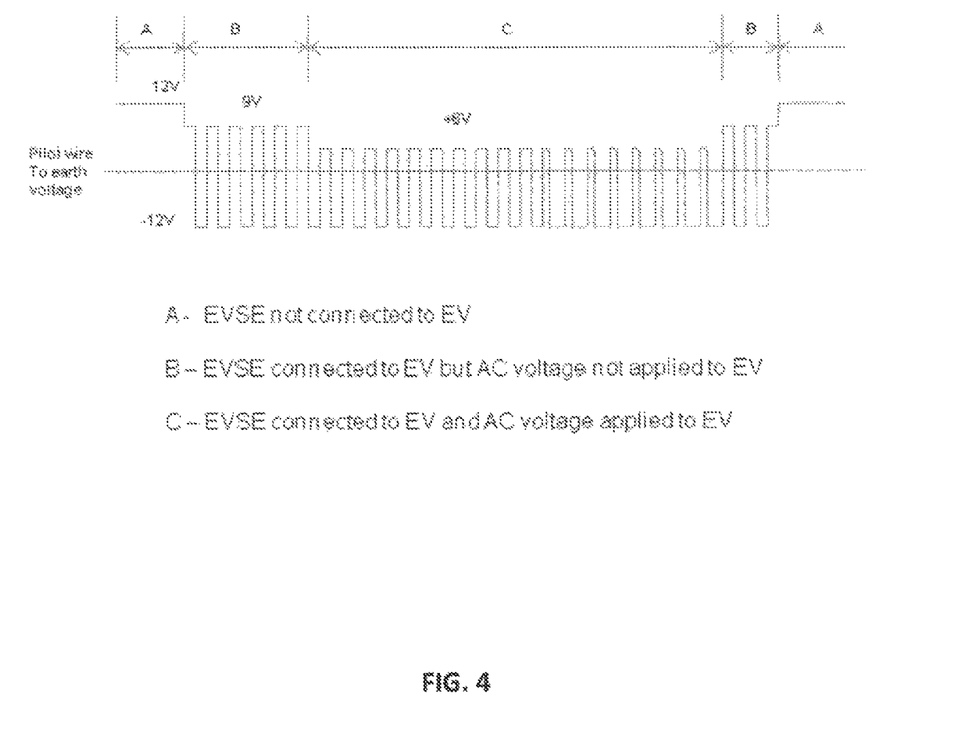
FIG. 4 illustrates an exemplary pilot wire (communication) signal definition, according to various aspects of the invention.

In the condition where EVSE 100 is not supplying AC voltage to the electric vehicle, the two power conductors may be de-energized. Typical waveforms associated with a pilot signal (of the pilot conductor) are shown in FIG. 4, for example (referred to as "pilot wire (communication) signal definition"). The pilot signal when the electric vehicle is not connected to the EVSE 100 is a solid +12V, (depicted by time intervals A in FIG. 4, for example). The pilot signal when the electric vehicle is connected to the EVSE 100 may include a variable duty cycle, for example, fixed 1 KHz, and +/−12V square wave signal supplied by the EVSE 100 through a 1K ohm resistance. The duty cycle signal may be established by the EVSE 100 based on the power conductors current rating, such as 12% for 20 A and 24% for 40 A. This insures that the current drawn by the electric vehicle may be limited to a value below a circuit protective device rating, which further insures that the protective device (typically a circuit breaker) does not trip. The pilot signal's amplitude may be determined by the electric vehicle via resistive loading that the vehicle applies to the pilot conductor. Three different pilot signal loads may be used corresponding to three unique states of the electric vehicle (A, B, C shown in FIG. 4, for example). The electric vehicle may be in state A when the vehicle is not connected or plugged in to the EVSE 100. The electric vehicle may be in state B or C when the vehicle is connected to or plugged in the EVSE 100.

Figure 5A:
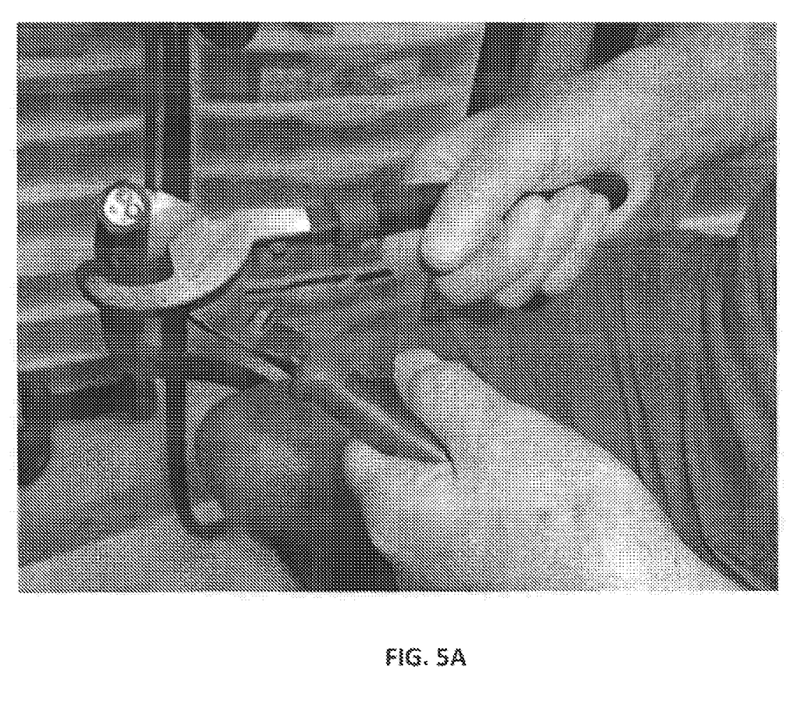
FIG. 5A depicts a cable being cut using a wire cutter, according to various aspects of the invention.
Figure 5B:
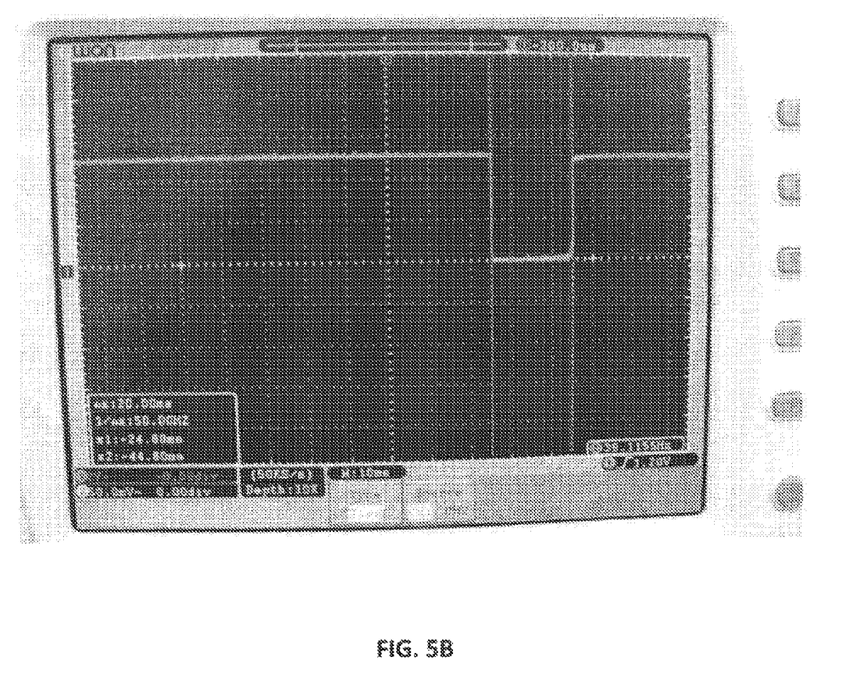
FIG. 5B depicts pilot signal voltage in response to the cable cutting, according to various aspects of the invention.

In some implementations, voltage of a normal pilot signal, as shown in FIG. 4, may pass through zero but not stay at zero. In contrast, when cable 110 is cut (using a wire cutter as depicted in FIG. 5A, for example), the voltage of the pilot signal may fall to zero and remain at zero for a period of time, as shown in FIG. 5B. FIG. 5B depicts the voltage of the pilot signal changing from +12V-to-zero and staying at zero for a period of time (for example, about 20 ms or longer).

In some implementations, sensor 320 may sense a pilot short (pilot-to-ground short). In some implementations, sensor 320 may sense a pilot short when the pilot signal voltage value is zero (i.e., has changed from +12V to 0V). In some implementations, sensor 320 may poll the pilot signal periodically to read the pilot signal voltage and detect the pilot short. In some implementations, recognizing that the short exists for at least 20 ms, the pilot signal may be polled faster, for example, every 10 ms. In some implementations, the pilot signal may be brought to a microprocessor port that may generate an interrupt on sensing a negative going transition of the pilot signal, wherein the negative going transition of the pilot signal indicates a change of pilot signal voltage from +12V to 0V.

In some implementations, processor 330 may be configured to determine that cable 110 in the EVSE 100 is being cut in response to the sensing. In some implementations, in response to sensing a pilot short (i.e., pilot signal voltage changing from +12V to 0V), processor 330 may determine that cable 110 is being cut. In some implementations, local and/or remote alerts may be generated in response to the determination that the cable 110 is being cut.

In the condition where EVSE 100 is supplying AC voltage to the electric vehicle, each of the two power conductors typically has 120 VAC power-to-ground (208 or 240 VAC power-to-power). When cable 110 is cut in this condition, a high current arcing fault may be generated. In some implementations, a circuit protective device (for example, a circuit breaker or other circuit protective device) may be coupled to the EVSE 100 to protect various components of the EVSE 100 or electric vehicle from being damaged due to the generated high current. The generated current may be high enough to cause the circuit protective device to de-energize the cable 110. For example, if a circuit breaker is used as a circuit protective device, the circuit breaker may move to a tripped or opened position to interrupt the flow of high current. In some implementations, the circuit protective device may typically be located ahead of the EVSE 100 so the EVSE may also be de-energized (in other words, the EVSE may lose AC power). The EVSE system may typically be de-energized in about 20 ms. It is likely that a 120 VAC-to-pilot fault may appear that would damage the pilot circuitry.

In some implementations, EVSE 100 may comprise one or more DC power supplies (derived from the AC supply). In case of AC power loss, the DC power supplies having storage capacitors may allow the EVSE 100 (i.e., components/electronics of the EVSE 100) to function for a particular period of time (for example, about 50 ms or longer) before losing complete power.

In some implementations, sensor 320 may sense loss of AC power. In some implementations, sensor 320 may sense AC power loss by detecting a missing pulse. For example, a pulse may be produced every half cycle (8.33 ms for 60 Hz) of the AC power line. This pulse may be used to reset a timer (set at for example, 15 ms) such that the timer does not time out. If the timer times out, a pulse is missing. In some implementations, sensor 320 may detect this missing pulse (in case of timer time out) which indicates loss of AC power.

In some implementations, processor 330 may be configured to determine that cable 110 in the EVSE 100 is being cut in response to the sensing. In some implementations, in response to sensing loss of AC power, processor 330 may determine whether the AC power loss is caused due to normal outage or abnormal outage. In some implementations, normal outage may include a regular utility power outage. In some implementations, abnormal outage may include outage caused by a cable short.

In some implementations, processor 330 may observe the pilot signal voltage. In some implementations, if the pilot signal voltage is normal for an electric vehicle plugged into the EVSE 100, processor 330 may determine that the AC power loss is caused due to normal outage. In some implementations, pilot signal voltage may be considered normal for an electric vehicle plugged into the EVSE 100 if the electric vehicle is in one of states B or C shown in FIG. 4. In some implementations, if the pilot signal voltage is not normal for an electric vehicle plugged into the EVSE 100, processor 330 may determine that the AC power loss is caused due to abnormal outage.

In some implementations, in response to determining that AC power loss is caused due to abnormal outage, processor 330 may determine that cable 110 is being cut. In some implementations, processor 330 may generate an alert that involves storing an event (i.e., AC power loss) and cause (i.e., normal or abnormal outage) in memory 340 before the DC power supplies fail. In some implementations, when power is restored, processor 330 may communicate the alert/event to central monitoring station 150 via communications circuitry 360 and link or network 145. In some implementations, no local alerts may be generated.

Figure 6:
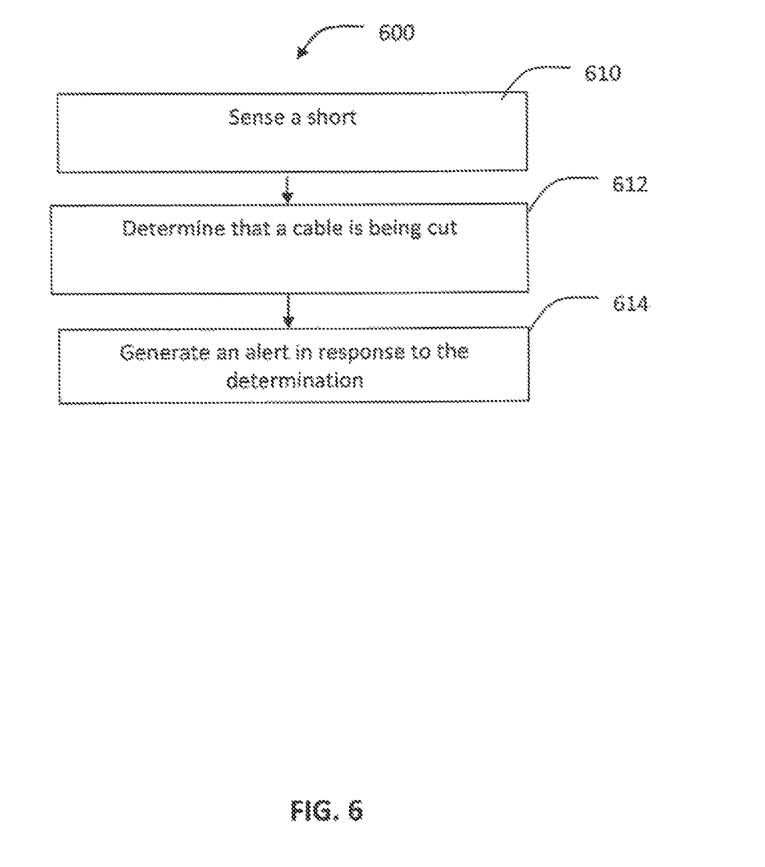
FIG. 6 illustrates a flowchart depicting example operations performed by an EVSE, according to various aspects of the invention.

FIG. 6 is a flowchart 600 depicting example operations performed by the EVSE 100, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 6. In yet other implementations, one or more operations may be performed simultaneously. In yet other implementations, one or more operations may not be performed. Accordingly, the operations described are exemplary in nature and, as such, should not be viewed as limiting.

In an operation 610, process 600 may sense a short between at least two components/pairs of components of cable 110 in the EVSE 100. In some implementations, a short may be created between various pairs of conductors of cable 110 when a thief cuts the cable 110. For example, a short may be created between two power conductors of cable 110, between a power conductor and a ground conductor of cable 110, or between a ground conductor and a pilot conductor of cable 110, In an operation 612, process 600 may determine that cable 110 is being cut in response to sensing that a short is created between at least two components/pairs of components of cable 110 in the EVSE 100. In an operation 614, process 600 may generate local and/or remote alerts in response to the determination that cable 110 is being cut.

Figure 7:
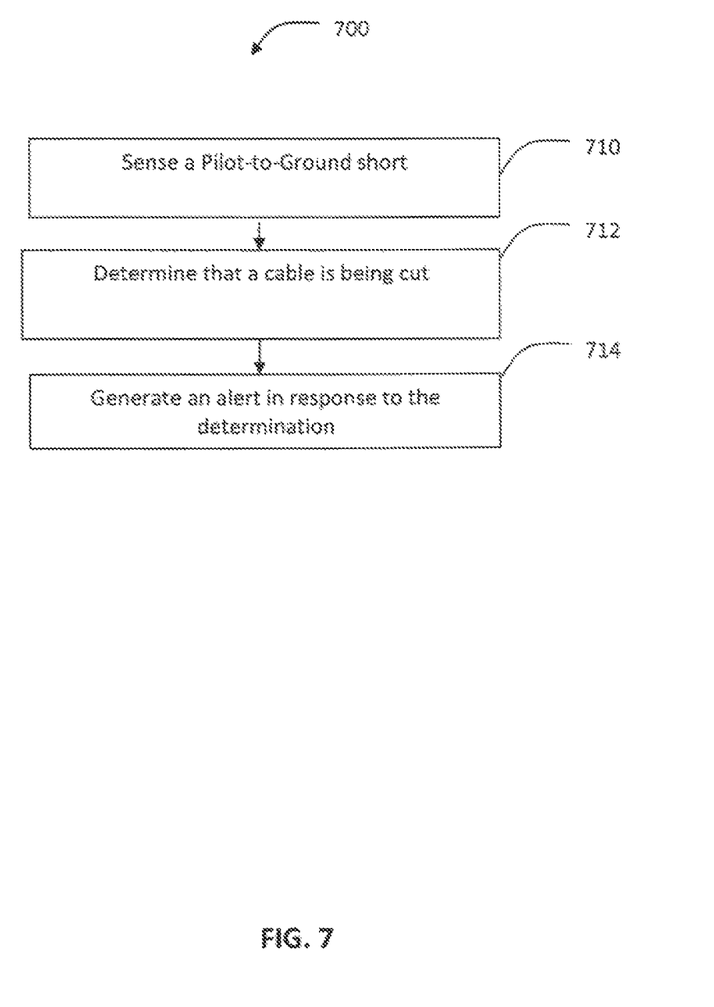
FIG. 7 illustrates a flowchart depicting example operations performed by an EVSE that is not supplying AC voltage to a plugged-in electric vehicle, according to various aspects of the invention.

FIG. 7 is a flowchart 700 depicting example operations performed by the EVSE 100 that is not supplying AC voltage to a plugged-in electric vehicle, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 7. In yet other implementations, one or more operations may be performed simultaneously. In yet other implementations, one or more operations may not be performed. Accordingly, the operations described are exemplary in nature and, as such, should not be viewed as limiting.

In an operation 710, process 700 may sense a pilot-to-ground short, wherein the pilot signal voltage is zero (i.e., has changed from +12V to 0V). A pilot-to-ground short may be created when a thief cuts cable 110. In an operation 712, process 700 may determine that cable 110 is being cut in response to sensing that a pilot-to-ground short is created. In some implementations, process 700 may generate local and/or remote alerts in response to the determination that cable 110 is being cut.

Figure 8:
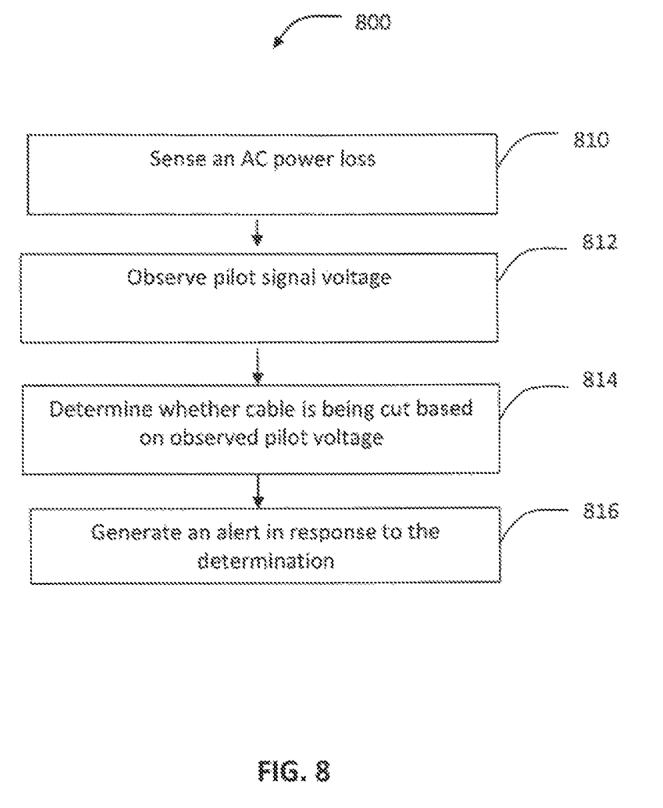
FIG. 8 illustrates a flowchart depicting example operations performed by an EVSE that is supplying AC voltage to a plugged-in electric vehicle, according to various aspects of the invention.

FIG. 8 is a flowchart 800 depicting example operations performed by the EVSE 100 that is supplying AC voltage to a plugged-in electric vehicle, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 8. In yet other implementations, one or more operations may be performed simultaneously. In yet other implementations, one or more operations may not be performed. Accordingly, the operations described are exemplary in nature and, as such, should not be viewed as limiting.

In an operation 810, process 800 may sense loss of AC power. In an operation 812, process 800 may observe pilot signal voltage value in response to the sensing of AC power loss. In an operation 814, process 800 may determine whether cable 110 is being cut based on the observed pilot signal voltage. For example, if the observed pilot signal voltage is not normal for an electric vehicle plugged into the EVSE 100, process 800 may determine that the AC power loss is caused due to the cutting of cable 110. In some implementations, process 800 may generate an alert that involves storing an event (i.e., AC power loss) and cause (for example, abnormal outage caused by cutting of cable). In some implementations, when power is restored, process 800 may communicate the alert/event to central monitoring station 150 via communications circuitry 360 and link or network 145.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An electric vehicle supply equipment (EVSE) comprising:
   a cable comprising at least two power conductors, at least one ground conductor, and at least one pilot conductor;
   a sensor configured to sense a pilot-to-ground short between the at least one ground conductor and the at least one pilot conductor, wherein the pilot-to-ground short is sensed when a pilot signal voltage value associated with the at least one pilot conductor remains zero for a particular period of time;
   a processor configured to:
      determine that the cable associated with the EVSE is being cut in response to the sensing of the pilot-to-ground short; and
      generate an alert in response to a determination that the cable is being cut.

2. The equipment of claim 1, wherein the sensor is configured to sense a negative-going transition of a pilot signal associated with the at least one pilot conductor, wherein the negative-going transition of the pilot signal indicates a change of the pilot signal voltage value to zero.

3. The equipment of claim 1, wherein the alert comprises a local audible alert.

4. The equipment of claim 1, wherein the alert comprises a local visual alert.

5. The equipment of claim 1, wherein the alert comprises a remote alert communicated to a central monitoring station.

6. An electric vehicle supply equipment (EVSE) comprising:
   a cable comprising at least two power conductors, at least one ground conductor, and at least one pilot conductor, wherein the at least two power conductors are configured to supply AC power to an electric vehicle;
   a sensor configured to sense a loss of the AC power;
   a processor configured to:
      observe a pilot signal voltage associated with the at least one pilot conductor;
      determine whether the pilot signal voltage is in an abnormal range;
      in response to a determination that the pilot signal voltage is in the abnormal range, determine that the loss of the AC power is due to the cable associated with the EVSE being cut; and generate an alert in response to the determination that the loss of the AC power is due to the cable being cut.

7. The equipment of claim 6, wherein the processor is further configured to:
in response to a determination that the pilot signal voltage is in a normal range, determine that the loss of the AC power is not due to the cable being cut.

8. The equipment of claim 6, wherein the alert comprises a remote alert communicated to a central monitoring station.

9. The equipment of the claim 8, wherein the remote alert comprises an event indicating the loss of the AC power and the cause of the loss of the AC power.

10. An electric vehicle supply equipment (EVSE) comprising:
a sensor configured to:
sense a short between at least two components of a cable in the EVSE when the EVSE is not supplying AC power to an electric vehicle, and
sense a loss of the AC power to the electric vehicle when the EVSE is supplying the AC power to the electric vehicle; and
a processor configured to:
determine that the cable is being cut in response to the sensing of the short between the at least two components of the cable or the sensing of the loss of the AC power to the electric vehicle; and
generate an alert in response to a determination that the cable is being cut.

11. The equipment of claim 10, wherein the sensor is further configured to sense the short between a first power conductor and a second power conductor of the cable.

12. The equipment of claim 10, wherein the sensor is further configured to sense the short between a power conductor and a ground conductor of the cable.

13. The equipment of claim 10, wherein the sensor is further configured to sense the short between a ground conductor and a pilot conductor of the cable.

14. The equipment of claim 10, wherein the alert includes an audible alert.

15. The equipment of claim 10, wherein the alert includes a visual alert.

16. The equipment of claim 10, wherein the alert includes a remote alert communicated to a central monitoring station.

17. A method for preventing cable theft in an electric vehicle supply equipment (EVSE), the method comprising:
sensing a pilot-to-ground short between a pilot conductor and a ground conductor of a cable in the EVSE, wherein the pilot-to-ground short is sensed when a pilot signal voltage value associated with the pilot conductor remains zero for a particular period of time;
determining that the cable is being cut in response to the sensing of the pilot-to-round short; and
generating an alert in response to a determination that the cable is being cut.

18. The method of claim 17, wherein the alert includes an audible alert generated at the EVSE.

19. The method of claim 17, wherein the alert includes a visual alert generated at the EVSE.

20. The method of claim 17, wherein the alert includes a remote alert communicated to a central monitoring station.

* * * * *